United States Patent [19]

Hayashida

[11] 4,219,243
[45] Aug. 26, 1980

[54] HYDRAULIC BRAKING PRESSURE CONTROL VALVE

[75] Inventor: Yoshihiro Hayashida, Chigasaki, Japan

[73] Assignee: Tokico Ltd., Kanagawa, Japan

[21] Appl. No.: 950,526

[22] Filed: Oct. 11, 1978

[30] Foreign Application Priority Data

Oct. 20, 1977 [JP] Japan .................... 52/140824[U]

[51] Int. Cl.² ............................................. B60T 13/06
[52] U.S. Cl. ................................ 303/6 C; 303/24 C; 303/24 F
[58] Field of Search .................... 303/6 C, 24 C, 24 F

[56] References Cited

U.S. PATENT DOCUMENTS

| | | | |
|---|---|---|---|
| 3,922,020 | 11/1975 | Koike | 303/6 C |
| 3,976,334 | 8/1976 | Farr | 303/6 C |
| 4,077,673 | 3/1978 | Takeshita | 303/6 C |

*Primary Examiner*—Trygve M. Blix
*Assistant Examiner*—Reinhard J. Eisenzopf
*Attorney, Agent, or Firm*—Wenderoth, Lind & Ponack

[57] ABSTRACT

A hydraulic braking pressure control valve for use in a vehicle includes a first inlet and outlet connected to a first pressure circuit, a second inlet connected to a second pressure circuit, a first piston having therethrough a liquid passage which normally connects the first inlet and outlet, a second piston receiving liquid pressure in the second inlet for displacing the first piston against the biassing force of a pressure control spring, and a valve mechanism associated with the first piston for closing the liquid passage when the first piston is displaced by a predetermined distance by the second piston. A plunger is provided with one surface thereof facing the first piston with the pressure control spring interposed therebetween and the other surface thereof receiving liquid pressure from the first pressure circuit, and an inertia valve is provided for cutting off the supply of liquid pressure to the other surface of the plunger at a predetermined deceleration of the vehicle.

5 Claims, 2 Drawing Figures

HYDRAULIC BRAKING PRESSURE CONTROL VALVE

BACKGROUND OF THE INVENTION

This invention relates to hydraulic braking pressure control valves for use in vehicle braking systems.

Conventionally, in applying brakes on a vehicle a major portion of the load of the vehicle will act on the front wheels and the load acting on the rear wheels will reduce according to the so-called "nose dive phenomenon", thus, the rear wheels will be locked earlier than the front wheels if braking forces applied on the front and rear wheels are equal. Therefore, it is required to reduce the braking pressure applied on the rear wheels as compared with that of the front wheels in accordance with the brake applying force, and there is usually provided a hydraulic braking pressure control valve for controlling braking pressure applied on the rear wheels, such that the braking pressure for the rear wheels will elevate at a reduced rate as compared with the braking pressure supplied to the front wheels.

Recently, there have been provided two braking pressure circuits respectively for the front wheels and rear wheels for securing safety of the vehicle, and in such case it is required to increase the braking force acting on the rear wheels when failure occurs in the pressure circuit for the front wheels and the braking function of front wheels is not available, as compared with a normal operating condition.

One prior art hydraulic braking pressure control valve of the aforementioned kind comprises a piston valve slidably received in a main body of the braking pressure control valve and having a liquid passage therethrough for passing braking liquid therethrough which is supplied to the rear wheels, an actuating piston being slidably received in the main body for receiving the braking pressure of the front wheels to bias the piston valve in one direction, a liquid pressure control spring for biassing the piston valve in a direction opposite to such one direction, and a valve body retained at a predetermined position in the main body and being adapted to engage with a seat formed in the liquid passage to close the passage. Upon depressing a brake pedal the braking pressure in the front wheels moves the piston valve in such one direction and closes the liquid passage at a predetermined pressure level (cut-off pressure) thus controlling the braking pressure for the rear wheels. Thereafter, when liquid pressure is supplied to the pressure control valve the passage repeatingly opens and closes, thus elevating the braking pressure supplied to the rear wheels at a reduced rate as compared with that of the front wheels. And when failure occurs in the pressure circuit for the front wheels, the actuating piston does not act to move the piston valve and thus the liquid passage is maintained to open and the braking pressure of the rear wheels is maintained equal to liquid pressure supplied to the control valve.

However, in a braking pressure control valve of the aforementioned kind, the braking pressure control spring has been arranged to extend between the piston valve and a plug screw-threadingly engaging with the main body, and the valve body has been fixedly retained at a predetermined position by a member associating with the plug. Therefore, it has not been possible to provide load responsive characteristics on the pressure control valve, viz. to change or adjust the braking pressure of the rear wheels by changing the strength of the braking pressure control spring in response to the weight or load distribution of the vehicle. More particularly, when the biassing force of the pressure control spring is changed in accordance with a change in the load by displacing, for example, the plug so as to change the distance between the plug and the piston valve, the valve body will accordingly displace, thus changing the distance between the valve body and the valve seat formed in the liquid passage, and therefore, the desired characteristics of the pressure control valve will not be attained.

BRIEF SUMMARY OF THE INVENTION

The present invention prevents the aforementioned shortcomings and is characterized in that the valve body is retained at a predetermined position in the main body, thus enabling adjustment of the strength or biassing force of the pressure control spring in response to the load distribution of the vehicle with respect to the front and rear wheels.

According to the present invention there is provided a hydraulic braking pressure control valve comprising a main body having a first inlet and outlet connected to a first pressure circuit and another inlet connected to a second pressure circuit, a piston valve slidably fitted in the main body and having a liquid passage connecting the first inlet and outlet with one another, an actuating piston receiving liquid pressure in the second inlet for biassing the piston valve in one direction, and a valve body disposed at a predetermined position in the main body for closing the liquid passage when the piston valve is moved by the actuating piston by a predetermined amount, wherein the valve body is retained by a retaining member secured in the main body through a valve stem extending toward the actuating piston through the liquid passage. A plunger is slidably disposed in the main body with one surface thereof facing one end surface of the piston valve and the other surface thereof receiving liquid pressure in the first inlet or the outlet so as to displace the plunger toward the piston valve. A liquid pressure control spring is disposed between the plunger and the piston valve, and there is provided an inertia valve for cutting off the supply of liquid pressure to the other surface of the plunger at a predetermined deceleration.

BRIEF DESCRIPTION OF THE DRAWINGS

Further objects and advantages of the present invention will be apparent from the following detailed description taken in conjunction with the drawings exemplifying a preferred embodiment of the present invention, in which.

DETAILED DESCRIPTION OF PREFERRED EMBODIMENT

Figures 1, 2:
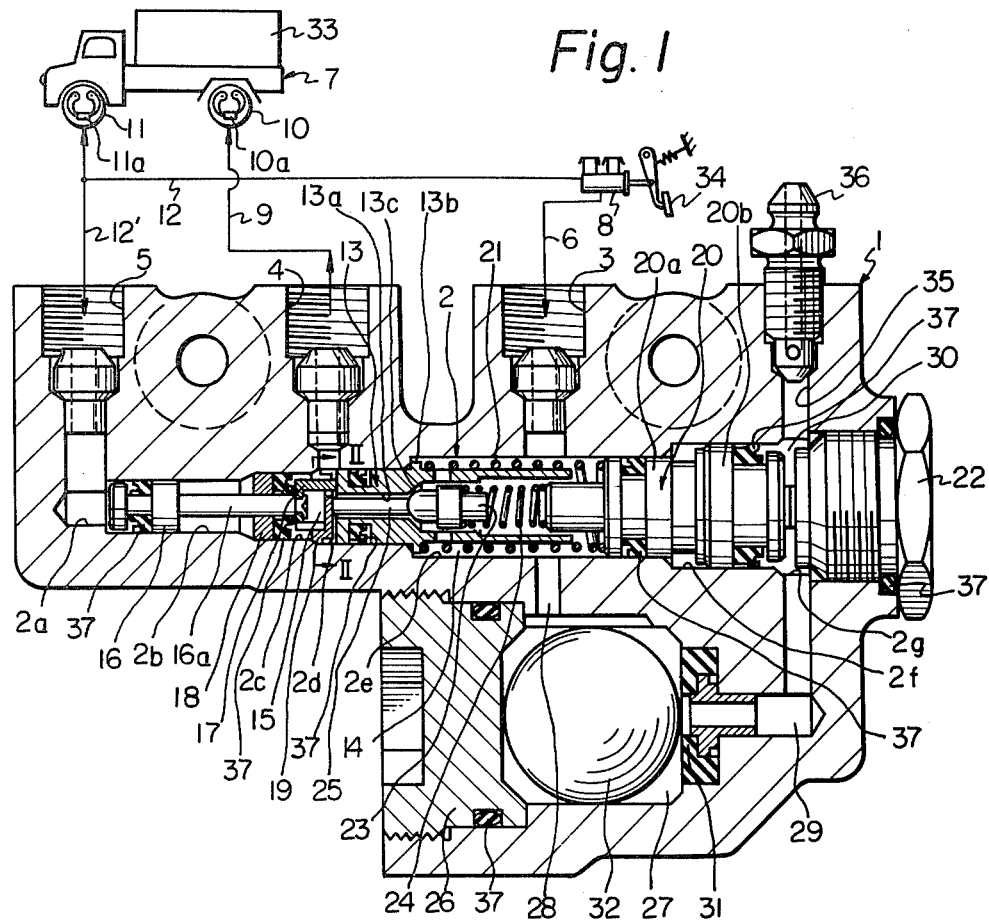
FIG. 1 is a longitudinal section of a braking pressure control valve according to the present invention.
FIG. 2 is a cross-sectional view taken along line II—II in FIG. 1.

In FIG. 1 a main body 1 of a hydraulic pressure control valve according to the present invention comprises an elongated hole 2 extending in the sidewise direction in the drawing and opening in the right end of the main body 1. The hole 2 is constituted by a plurality of bore portions disposed on a common axis and communicating with one another with the diameters thereof steppingly increasing in the rightward direction, viz. bore portion 2a, cylinder portion 2b, bore portion 2c, cylinder portions 2d, 2e, and 2f, and bore portion 2g.

The main body 1 has also an inlet 3 opening at a generally mid portion of the cylinder portion 2e, and an outlet 4 opening at the left end portion of the cylinder portion 2d, and an inlet 5 opening at the bore portion 2a. The inlet 3 and the outlet 4 are connected to one or a first pressure circuit, more particularly, the inlet 3 is connected through a piping 6 to a master cylinder 8 of a vehicle 7, and the outlet 4 is connected through a piping 9 to rear wheels 10 (brake cylinders 10a) of the vehicle 7. The inlet 5 is connected to another or a second pressure circuit, viz. the inlet 5 is connected to a piping 12' which is divided from a piping 12 connecting front wheels 11 (brake cylinders 11a) of the vehicle 7 with the master cylinder 8.

A piston valve 13 having a liquid passage 13a connecting the cylinder portions 2d and 2e is slidably fitted in the cylinder portion 2d, and a retaining projection 13b of the piston valve 13 is adapted to engage with a step or shoulder between the cylinder portions 2d and 2e so as to define a normal inactuated position of the piston valve 13 as shown in the drawing. And, there are formed in the cylinder portions 2d and 2e a first liquid chamber 14 communicating with the inlet 3 and a second liquid chamber 15 communicating the outlet 4.

An actuating piston 16 is slidably fitted in the cylinder portion 2a and is adapted to move in the rightward direction upon receiving hydraulic pressure of the inlet 5. When the actuating piston 16 moves in the rightward direction the piston valve 13 is moved in the rightward direction through a pushing member 17 which is secured to the tip end of a small diameter portion 16a of the actuating piston 16. The small diameter portion 16a slidably extends through a bearing member 18 which in turn is disposed in the bore portion 2c and acts also as a seal retaining member. The pushing member 17 receives freely therethrough, as shown in FIG. 2, a retaining member 19 which will hereinafter be explained.

On the rightside of the piston valve 13 there is disposed a plunger 20 straddling the cylinder portions 2e and 2f, with a small diameter portion 20a thereof being slidable in the cylinder portion 2e and a large diameter portion 20b thereof being slidable in the cylinder portion 2f. A pressure control spring 21 is disposed to extend between the plunger 20 and a retaining projection 13b of the piston valve 13, and a plug 22 screw-threadingly engaging with the bore portion 2g acts as a stop preventing rightward movement of the plunger 20 upon receiving biassing force of the spring 21. Further, the small diameter portion 20a and the large diameter portion 20b are formed such that the difference between pressure receiving areas of these portions is substantially larger than pressure receiving area of the actuating piston 16.

A valve seat 13c is formed on the mid portion of the liquid passage 13a of the piston valve 13, and a valve body 23 is retained at a predetermined position so as to engage with the valve seat 13c when the valve piston 13 moves rightward by a predetermined amount. More particularly, the retaining member 19 engages with a step defined between the cylinder portion 2d and the bore portion 2c and is prevented from movement in the leftward direction and the valve body 23 biassed in the leftward direction by a spring 24 extending between the valve body 23 and the plunger 20 is normally retained at a position spaced from the valve seat 13c by a predetermined amount, by the retaining member 19 and a valve rod 25 extending through the liquid passage 13a.

In the illustrated embodiment, the valve body 23 and the valve rod 25 are formed integrally, and the valve rod 25 normally abuts with the retaining member, but the valve rod 25 may be formed separately from the valve body 23 with the valve rod 25 being integrally secured to the retaining member 19 by a screw-threading or the like.

Incidentally, the spring 24 is sufficiently weaker than the pressure control spring 21 so that the spring 24 has not any substantial effect on controlling braking pressure supplied to rear wheel brakes. The spring 24 may be omitted by securing integrally the retaining member 19, the valve body 23 and the valve rod 25 by screw-thread connections or the like, however it is advisable to form the retaining member 19 separately from the valve rod 25 so as to prevent deformation of the constituting parts or displacement of the retaining member 19 in receiving excessive force from the piston valve 13.

Further, there is defined in the main body 1 an inertia valve chamber 27 which is closed by a cap 26 screw-threadingly secured to the main body 1, and the inertia valve chamber 27 is connected through passages 28 and 29 with the first liquid chamber 14 and a third liquid chamber 30 which is formed between the plunger 20 and the plug 22. The passage 29 extending from the third liquid chamber 30 opens in the rightside wall of the inertia valve chamber 27 with a valve seat 31 being formed therearound. A spherical inertia valve body 32 disposed rotatably in the inertia valve chamber 27 is adapted to engage (or disengage) the valve seat 31. The inertia valve body 27 is formed of such as iron or the like so as to have a large inertia force.

The pressure control valve shown in the drawing is mounted on the vehicle such that the longitudinal axis of the hole 2 is inclined leftward and downward and the left side of the valve is directed to the rear of the vehicle. Alternatively, the axis of the hole 2 may be disposed parallel to the longitudinal axis of the vehicle with leftwardly and downwardly inclining rails being disposed in the inertia valve chamber 27. Thus, the inertia valve body 32 is spaced from the valve seat 31 in normal operating condition.

In the drawing, shown at 35 is an air bleeding passage, at 36 is a bleeding screw for closing normally the air bleeding passage 35, and at 37 are seal members for attaining liquid sealing between corresponding parts.

The hydraulic pressure control valve having the construction as described heretofore operates as follows:

In the inactuated condition of brake, the valve takes the position as shown in FIG. 1. When brake pedal 34 is depressed braking liquid pressure for the rear wheel brakes is transmitted from the master cylinder 8 to the first liquid chamber 14, the liquid passage 13a, the second liquid chamber 15, and the third liquid chamber 30, and to the rear wheels 10, while, braking liquid pressure in the second pressure circuit is transmitted to front wheels 11.

The actuating piston 16 receives braking liquid pressure for the front wheels and biasses rightwards the piston valve 13, and the biassing force caused thereby cooperates with liquid pressure in the second pressure chamber 15 to urge the piston valve 13 rightwards against the biassing force of the pressure control spring 21 and against liquid pressure in the first liquid chamber 14. When liquid pressure supplied from the master cylinder 8 is increased sufficiently to move rightwards the piston valve 13 by a predetermined amount, the valve body 23 engages with the valve seat 13*c* of the piston valve 13 to close the liquid passage 13*a*, at that time, rear wheels 10 receive liquid pressure in the second liquid chamber 15 which is separated from the first liquid chamber 14.

Thereafter, when the brake pedal 34 is further depressed, liquid pressure in the first liquid chamber 14 increases thus moving leftwards the piston valve 13 thereby opening the liquid passage 13*a*. Liquid pressure in the second liquid chamber 15 increases slightly and the valve body 23 will engage the valve seat 13*c* again. In such way, the valve body 23 will repeatingly engage and disengage with the valve seat 13*c* so that liquid pressure supplied to rear wheels 10 elevates at a reduced rate as compared with liquid pressure supplied to front wheels 11.

When a predetermined deceleration acts on the vehicle 7 upon applying the brakes, the inertia valve body 32 rollingly moves to engage with the valve seat 31 whereby liquid pressure in the third liquid chamber 30 will not increase further even though the brake pedal 34 would be depressed further. The predetermined deceleration aforementioned will act when the depressing force is small if load 33 of the vehicle 7 is light as compared with the load 33 being heavy, viz. the inertia valve body 32 will engage with the valve seat 31 when liquid pressure in the liquid chambers 14 and 30 is low if load 33 of the vehicle 7 is low. In such condition the pressure control spring 21 has not been compressed so much by the plunger 20 that the biassing force of the spring 21 is small, and pressure controlling function of the piston valve 13 is effected based on the small biassing force of the pressure control spring 21.

However, when the load 33 on the vehicle 7 is heavy, the predetermined deceleration acts when braking pressure is sufficiently high. Thus, pressure in the third liquid chamber 30 is high and the plunger 20 has been further displaced, thereby highly compressing the pressure control spring 21 and, therefore, biassing force of the pressure control spring is increased, and the piston valve 13 effects the liquid pressure controlling function based on the increased biassing force.

As described heretofore, the biassing force of the pressure control spring 21 determined by the plunger 20 will change in accordance with the load 33, thus, braking pressure applied to the rear wheels is determined in accordance with the load 33.

Incidentally, when failure occurs in the pressure circuit of front wheels 11 by such as leakage of braking liquid in the piping 12 or the like and the braking function of the front wheels 11 cannot be expected, the actuating piston 16 does not generate the force to bias the piston valve 13 rightwardly, and the piston valve 13 does not move to close the liquid passage 13*a*. As a result, braking liquid transmitted to rear wheels 10 will not be controlled by the piston valve 13 and, braking pressure generated in the master cylinder 8 is transmitted directly to rear wheels 10. Thus, the braking action on the rear wheels will be increased as compared with the condition when the pressure circuit of front wheels 11 is normal.

In the illustrated embodiment the third liquid chamber 30 is connected to inlet 3, but the third liquid chamber 30 may be connected to the outlet 4 or to the inlet 5.

As described heretofore in detail, the pressure control valve according to the present invention comprises a retaining member being fixedly disposed in the main body without receiving any effects from the elements for changing the biassing force of the liquid pressure control spring, a valve body for opening or closing a liquid passage in a piston valve being retained at a predetermined position by the retaining member, and an inertia valve for controlling, in accordance with the load of the vehicle, displacement of a plunger which acts to change the biassing force of the liquid pressure control valve. Thus, it is possible to afford load responsive characteristics on a prior art pressure control valve of the type which has not been provided with such load responsive characteristics, and there accordingly result noticeable advantages in practical use.

I claim:

1. A hydraulic braking pressure control valve for a vehicle, said control valve comprising:

a main body having therein an elongated bore having first and second opposite ends, said bore including at least a relatively larger diameter bore portion at a position between said first and second ends of said bore and a relatively smaller diameter bore portion adjacent said second end of said bore;

a first piston slidably received within said larger diameter bore portion and having first and second ends directed toward said first and second ends, respectively, of said bore;

a second piston slidably received within said smaller diameter bore portion and having first and second ends directed toward said first and second ends, respectively, of said bore;

a first inlet adapted to be connected to a braking fluid pressure source, said first inlet extending through said main body into said bore at a position to direct fluid pressure from the source against said first end of said first piston, thereby urging said first piston in a first direction toward said second end of said bore;

an outlet adapted to be connected to a first braking pressure circuit, said outlet extending through said main body from said bore at a position between said first and second pistons;

a second inlet adapted to be connected to the braking fluid pressure source and to a second braking pressure circuit separate from said first braking pressure circuit, said second inlet extending through said main body into said second end of said bore at a position to direct fluid pressure from the source against said second end of said second piston, thereby urging said second piston in a second direction toward said first end of said bore;

said first piston having extending therethrough a fluid passage normally connecting said first inlet and said outlet, said fluid passage including a first end defining a valve seat and a second end opening in said second end of said first piston;

a plunger slidably received within said bore at a position between said first end of said bore and said first piston, said plunger having a first end facing said first end of said bore and a second end facing said first piston;

pressure control spring means positioned between said plunger and said first piston for urging said first piston in said first direction;

a valve body positioned within said bore;

retaining means positioned within said bore for maintaining said valve body in a fixed position within said bore, said valve body being spaced from said valve seat when said first piston is moved in said first direction;

said second piston having extending from said first end thereof a piston rod carrying at a free end thereof pushing means for, when fluid pressure in said second inlet moves said second piston in said second direction, abutting said second end of said first piston and causing said first piston to move in said second direction against the force of said pressure control spring means and for thereby causing said valve seat to contact said valve body, thus closing said fluid passage and isolating said first inlet from said outlet;

said pushing means including a generally cylindrical portion having therein a plurality of slots extending axially of said bore;

said retaining means including a plurality of members freely received within said slots, thereby enabling relative axial movement of said pushing means with respect to said retaining means;

passage means for communicating a selected fluid pressure from one of said first inlet, said outlet and said second inlet to said first end of said plunger and for thereby adjusting the biasing force of said pressure control spring means as a function of the level of said selected fluid pressure; and inertia valve means for closing said passage means and interrupting the communication of said selected fluid pressure to said first end of said plunger upon a predetermined deceleration of the vehicle upon braking thereof.

2. A control valve as claimed in claim 1, wherein said passage means comprises an inertia chamber within said main body, a first passage extending through said main body from said bore at a position adjacent said first inlet to said inertia chamber, and a second passage extending through said main body from said inertia chamber to said bore at a position between said first end thereof and said plunger.

3. A control valve as claimed in claim 2, wherein said inertia valve means comprises a valve seat formed in an end of said second passage opening into said inertia chamber, and a rollable inertia valve body loosely positioned within said inertia chamber and adapted to roll therein against said valve seat and to close said second passage upon said predetermined deceleration.

4. A control valve as claimed in claim 1, wherein the cross-sectional area of said first end of said plunger is greater than the cross-sectional area of said second end of said plunger.

5. A control valve as claimed in claim 1, wherein said retaining means further includes a valve rod extending through said fluid passage in said first piston from said valve body to said plurality of members, and spring means between said valve body and said second end of said plunger for preventing said valve body from moving in said second direction.

* * * * *